J. A. TAFT.
BALE CORE OPERATING DEVICE.
APPLICATION FILED FEB. 21, 1918.

1,272,724.

Patented July 16, 1918.
3 SHEETS—SHEET 1.

Witness
P. J. Gathmann

Inventor
John A. Taft,
By Ramsey and Parmelee
Attorney

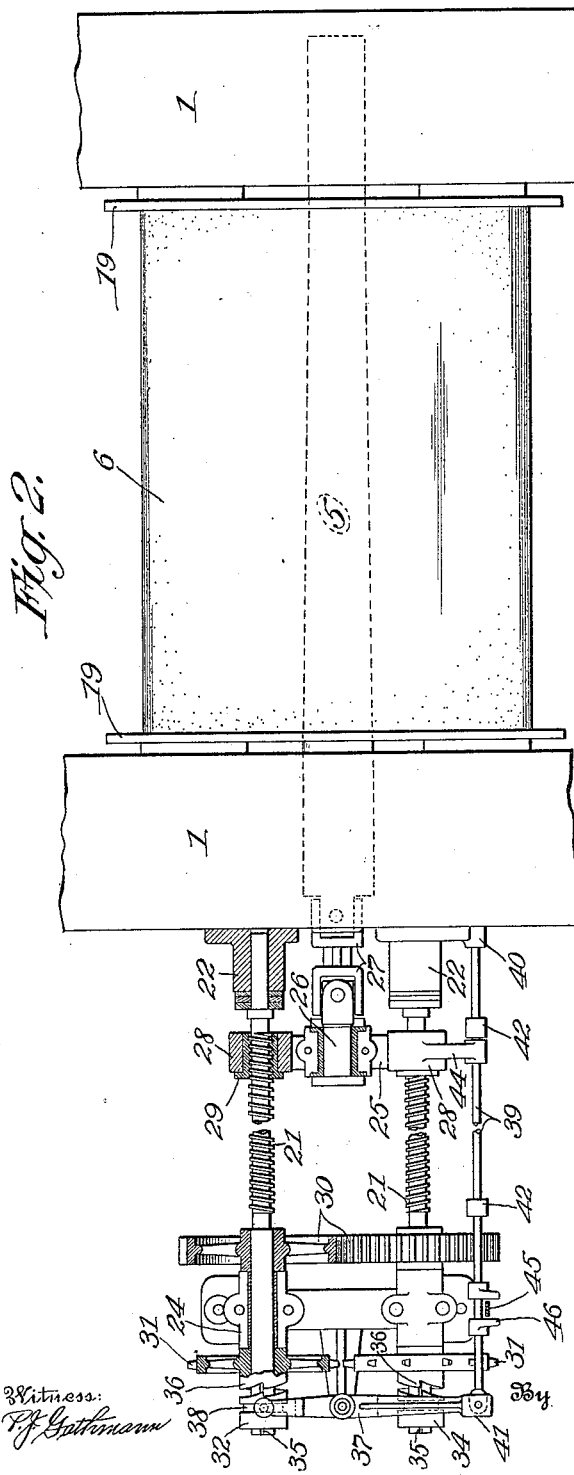

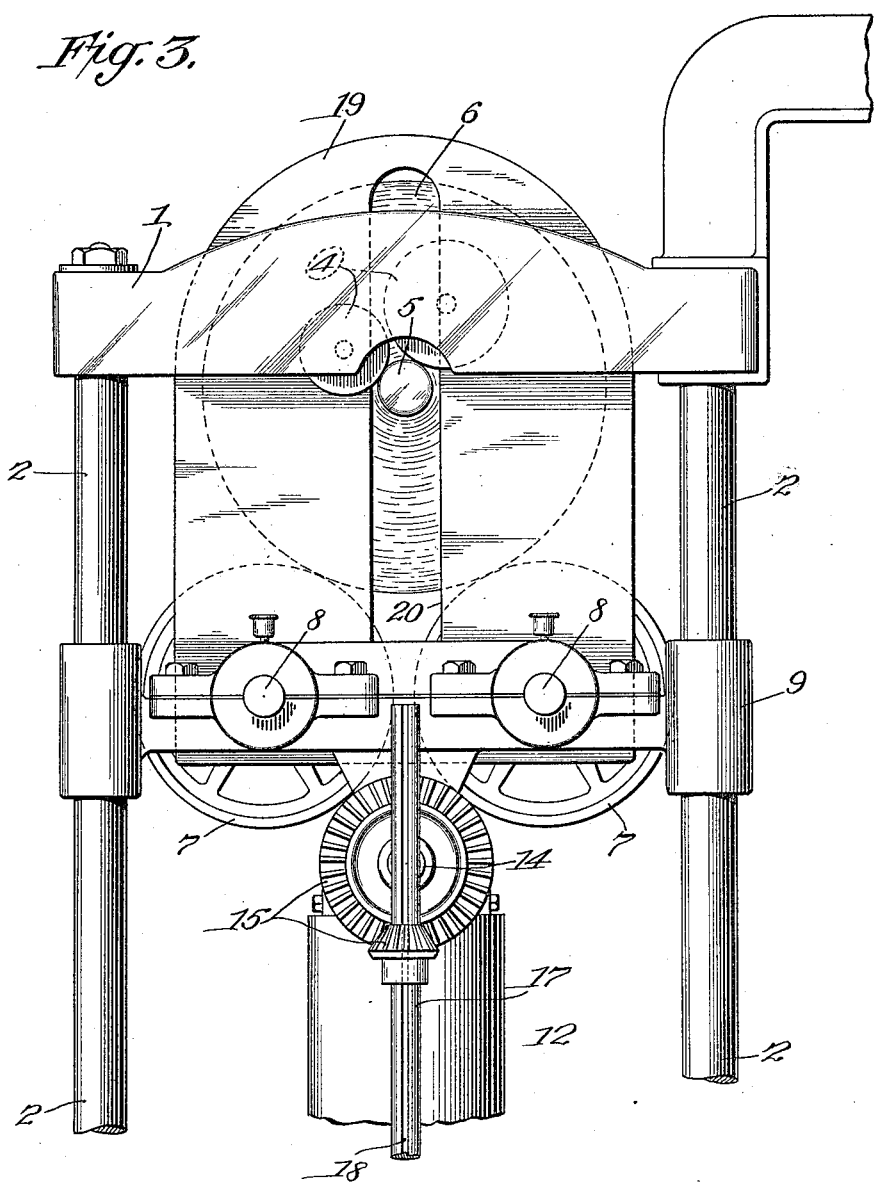

UNITED STATES PATENT OFFICE.

JOHN A. TAFT, OF SAN ANTONIO, TEXAS, ASSIGNOR TO REAGAN BALE COMPANY, OF SAN ANTONIO, TEXAS, A CORPORATION OF TEXAS.

BALE-CORE-OPERATING DEVICE.

1,272,724. Specification of Letters Patent. Patented July 16, 1918.

Application filed February 21, 1918. Serial No. 218,428.

*To all whom it may concern:*

Be it known that I, JOHN A. TAFT, a citizen of the United States, and a resident of the city of San Antonio, in the county of Bexar and State of Texas, have invented certain new and useful Improvements in Bale-Core-Operating Devices, of which the following is a specification.

This invention relates broadly to presses, and more particularly to improvements of presses for making round cotton bales, of the general character covered by my copending application Serial No. 92,391, filed April 20, 1916.

The principal object of the present invention is to provide a suitable core with supporting journals for each end, and around which the bale may be formed, together with means for withdrawing the core from the finished bale while the same is carried by the press, and supporting the same in withdrawn position.

A further object of the present invention is to provide a power operated device constituting a part of the press for rapidly withdrawing the core from the cotton bale, and then replacing the same in position in the press so that a new bale may be formed thereon.

A further object of the present invention is to provide a device of the above nature which shall be semi-automatic in its operation.

These objects together with attendant advantages will be obvious as the invention becomes better understood by reference to the accompanying specification, and drawings forming a part thereof, throughout the several views of which like characters of reference have been used to indicate like parts.

Referring to the drawings, Figure 1 is a view partly in section illustrating the core pin ready for withdrawal from a finished bale.

Fig. 2 is a plan view of the core inserting and withdrawing mechanism showing its relation to the press structure.

Fig. 3 is an end view of the press having a finished bale therein.

Figure 1:
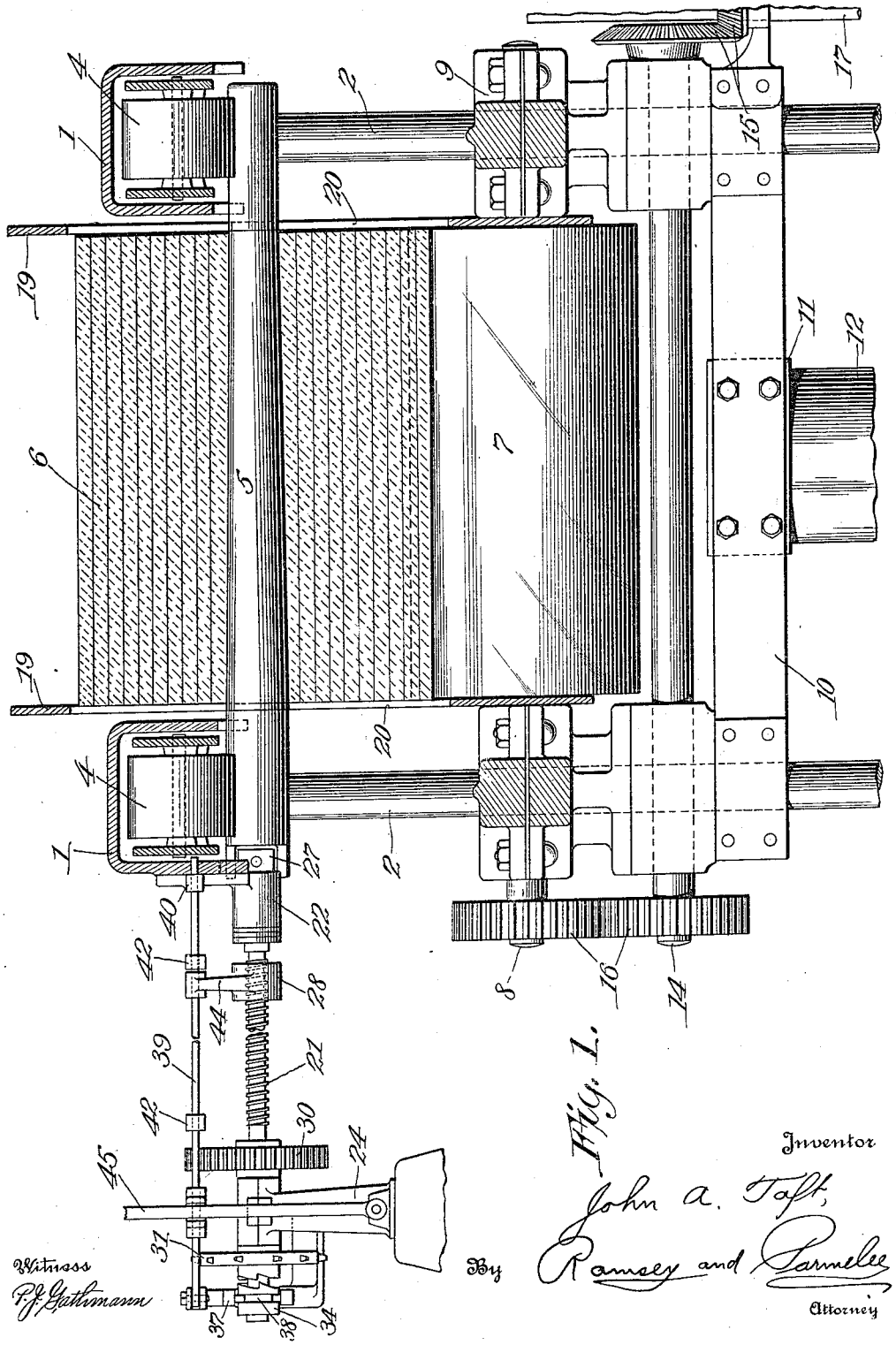

Heretofore in the commercial art of making round bales it has been the general custom to provide a cylindrical shaft on which were mounted oppositely projecting tapering sleeves, the taper of the sleeves being toward the position which would correspond to the center of a finished bale. This shaft together with the sleeves carried thereby constituted a core upon which the cotton bale was formed. As the baling operation took place under a heavy pressure, the cotton was heavily compressed around the sleeves, and after the bale was removed from the press considerable difficulty was experienced in attempting to remove the shaft and sleeves therefrom. The removal of these parts was invariably accompanied by the cotton which surrounds the core sticking to the sleeves, so that the center of the bale was drawn out with the sleeves thus destroying the finished product.

A further objection to devices as heretofore constructed has been that it has been necessary to remove the bale from the press, and then after supporting the same in a suitable manner withdraw the core. So far as I am aware it has never been proposed to construct a press having bearings for the opposite ends of a core pin of generally tapered construction throughout its entire length, and then provide a mechanism constituting a part of the press structure adapted to be at all times secured to the core pin and operable to withdraw the same from a finished bale while the same is carried by the press, support the same in withdrawn position, and then reinsert the same in operative position for the formation of a new bale. It is the purpose of the present invention to overcome the defects and difficulties experienced in connection with the structures heretofore used, by providing a tapering core formed in one piece with supporting bearings for each end and then equipping the press with a device adapted to operate in the manner just described.

Referring more particularly to the drawings, the press comprises a suitable head frame 1 secured to and carried by the vertical supporting guides 2. The head frame may be provided with anti-friction bearings 4 such as disclosed and claimed in my application Serial No. 139,597, filed December 29, 1916. These bearings are so arranged that they engage the opposite ends of the tapered core 5 around which the cotton bale 6 is formed, so that they take up the thrust exerted on the core during the wrapping of the cotton batting therearound. Coöperating with the core 5 for winding the batting tightly thereon, there may be provided a pair of pressure rolls 7, which are preferably disposed one on each side of a vertical plane passing through the longitudinal axis of the core. The rolls 7 are mounted on shafts 8 suitably journaled in the sliding cross head 9, yieldingly supported to permit a sliding movement on the vertical guides 2 as the bale increases in diameter. This is accomplished by securing the same to a cross bar 10 rigidly mounted on an extension 11 of the piston member 12 of any convenient form of hydraulic press and air cushion device, such for example as that shown and claimed in my application Serial No. 177,130, filed June 26, 1917. The cross head also carries the driving shaft 14 to which power is transmitted through the bevel gears 15, and which in turn drives the pressure rolls through the spur gears 16. One of the gears 15 is slidably secured to the shaft 17 by means of a suitable key way 18, thereby permitting the gear to move longitudinally of the shaft as the cross head descends due to the increase in diameter of the bale.

For protecting and forming the ends of the cotton bale I preferably provide a pair of vertical end plates 19 each having a centrally formed slot 20 of a width sufficient to permit the same to readily span the core pin. The plates 19 are carried by the cross head 9 so that they reciprocate with the pressure rolls, the slots formed therein readily permitting this operation. The frictional contact of the cotton at the ends of the bale against the vertical end plates does not injure the fiber, and constitutes means for keeping the bale in proper position and forming true ends thereon.

For withdrawing the core pin from a finished bale while the same is carried by the press, and supporting the same in such position that it may be readily reinserted into the press when it is desired to form another bale, I have provided an ejecting or withdrawing device comprising a pair of oppositely threaded shafts 21 rigidly journaled at their inner ends in a supporting bracket 22 secured in any desired manner to one side of the head frame 1, and at their outer ends journaled in the upright 24 of any desired construction. The bracket 22 and the upright 24 are so disposed that they maintain the threaded shafts in a position in which they aline, or lie in a common horizontal plane with the core pin. A suitable means for connecting the core pin to the withdrawing mechanism is here shown as comprising a yoke 25 adapted to rotatably receive a projection 26 secured to the core pin through the medium of a suitable flexible coupling 27 functioning in the usual manner. The yoke 25 has enlarged or hub portions 28 provided with bushings or the like 29 adapted to coöperate with the shafts 21.

The shafts 21 are geared for synchronous rotation in opposite directions by intermeshing spur gears or their equivalents 30 in suitable driving relationship with the shafts. Power for driving the shafts is transmitted to the same through sprockets 31 both of which are adapted to be driven in the same direction by a sprocket chain or belt not here shown. The sprockets are preferably loosely mounted on the shafts 21, to which they may be connected at will in driving relation by means of the sliding clutch members 32 and 34 which are suitably splined or keyed to the shafts as indicated at 35, and designed to be slid into and out of operative engagement with the clutch teeth 36 formed on the sprockets 31 by means of a pivoted lever 37 having forked ends engaging the grooves 38 of the clutch members.

In order that the operation of the threaded shafts and their associated parts constituting withdrawing mechanism may be semi-automatic in operation, it is necessary to provide suitable means for controlling the movement of the pivoted operating lever 32. This means is here shown as comprising a longitudinally extending rod 39 mounted for reciprocation in the bearing 40 of the press head frame and connected at its outer end to the upstanding arm 41 carried by the lever 37. Secured in proper spaced relation on the rod 39 are stops 42 adapted to be engaged by the lug 44 of the yoke 25 when the same has traveled a sufficient distance in one direction or the other to either completely insert or withdraw the core pin. For manually setting the device into operation I have provided a hand lever 45 pivotally secured to the upright 24 and operative to reciprocate the rod 39 through the medium of collars 46 formed thereon. From the foregoing it is believed that it will be obvious that as soon as the lever 45 is moved to one position or the other either the clutch 32 or 34 will be moved into engagement with its corresponding sprocket wheel 31 so as to cause rotation in the proper direction of the threaded shafts 21. As soon as the shafts have operated for a sufficient length of time to move the core pin the desired distance, the lug 44 will engage one of the stops 42 and disconnect the clutch which was previously manually thrown into engagement.

It will now be apparent that the core pin may be readily withdrawn from a finished bale while the same is still retained in position in the press. After the core has been withdrawn it is supported in such position that it may be readily replaced in the machine as soon as desired for the formation of another bale. With a device of this nature all lifting of the core pin is eliminated, and due to the fact that the end of the bale is in contact with the vertical end plates the gradual withdrawal of the pin is accompanied by an expansion of the fibers immediately surrounding the same so that the finished bale is compact throughout. This feature is desirable as it prevents the formation of a hard center at the core of the bale which has heretofore resulted in the damaging by breaking of the cotton fibers in this portion.

In view of the fact that the same result may be obtained by structures differing somewhat in detail, it is understood that the drawings are representative of the preferred embodiment of my invention.

What I claim is—

1. In a cotton bale forming machine, in combination, a head frame, bearings mounted therein, a tapered core pin in engagement with said bearings, means for wrapping cotton around said pin, a core withdrawing and supporting device comprising a plurality of oppositely threaded shafts, means for rotating said shafts in opposite directions, a yoke movable longitudinally of the shafts, means for connecting the yoke to the core pin, and means for reversing the direction of rotation of the shafts.

2. In a cotton bale forming machine, in combination, a head frame, bearings mounted therein, a tapered core pin in engagement with said bearings, means for wrapping cotton around said pin, a core withdrawing and supporting device comprising a plurality of oppositely threaded shafts, means for synchronously rotating said shafts in opposite directions, a yoke movable longitudinally of the shafts, a flexible joint for connecting the yoke to the core pin, and means for reversing the direction of rotation of the shafts.

3. In a cotton bale forming machine, in combination, a head frame, bearings mounted therein, a core pin in engagement with said bearings, means for wrapping cotton around said pin, a core withdrawing device comprising a plurality of oppositely threaded shafts journaled in the head frame, means for synchronously rotating said shafts in opposite directions, a yoke movable longitudinally of the shafts, means for connecting the yoke to the core pin, and means for reversing the direction of rotation of the shafts.

4. In a cotton bale forming machine, in combination, a head frame, bearings mounted therein, a core pin in engagement with said bearings, means for wrapping cotton around said pin, a core withdrawing device comprising a plurality of oppositely threaded shafts journaled in the head frame, means for synchronously rotating said shafts in opposite directions, a yoke movable longitudinally of the shafts, means for connecting the yoke to the core pin, means for reversing the direction of rotation of the shafts, and means for automatically stopping the rotation of the shafts after a predetermined period.

5. In a cotton bale forming machine, in combination, a head frame, bearings mounted therein, a core pin in engagement with said bearings, means for wrapping cotton around said pin, a core withdrawing device comprising a plurality of shafts journaled at one end in the head frame at opposite sides of the core pin, means for synchronously rotating said shafts, a yoke movable longitudinally of the shafts, means for connecting the yoke to the core pin, and means for reversing the direction of rotation of the shafts.

6. In a cotton bale forming machine, in combination, a head frame, bearings mounted therein, a core pin in engagement with said bearings, means for wrapping cotton around said pin, a core withdrawing device comprising a plurality of shafts, said shafts being journaled at one end in the head frame at opposite sides of the core pin so as to exert a balanced pull thereon, means for synchronously rotating said shafts, flexible means for connecting the yoke to the core pin, and means for reversing the direction of rotation of the shafts.

7. A device for controlling a core pin of a bale forming machine, comprising a pair of threaded shafts, a yoke in engagement therewith and movable longitudinally thereof, means for connecting the yoke to the core pin, and means for rotating said shafts in either direction to cause reciprocation of the yoke in either direction.

8. A device for controlling a core pin of a bale forming machine, comprising a pair of threaded shafts, a yoke in engagement therewith and movable longitudinally thereof, flexible means for connecting the yoke to the core pin, and means for rotating the shafts in either direction to cause reciprocation of the yoke in either direction.

9. A device for controlling a core pin of a bale forming machine, comprising a pair of threaded shafts, a yoke in engagement therewith and movable longitudinally thereof, means for connecting the yoke to the core pin, means for rotating the shafts in either direction to cause reciprocation of the yoke in either direction, and means controlled by the movement of said yoke for automatically stopping the rotation of said shafts.

10. A core controlling device for a bale forming machine, comprising a pair of threaded shafts, a yoke carried by said shafts and operable thereon, means for connecting the core pin to the yoke, means for causing said shafts to rotate in unison, and separate driving means on each shaft.

11. A core controlling device for bale forming machines, comprising a plurality of threaded shafts, a yoke carried by said shafts and operable thereon, means for connecting the core pin to the yoke, means for causing said shafts to rotate in synchronism, and separate driving means engageable at will with each of said shafts.

12. A core controlling device for bale forming machines, comprising a pair of threaded shafts, a yoke carried by said shafts and operable thereon, means for connecting the core pin to the yoke, means for causing said shafts to rotate in synchronism, separate driving means loosely mounted on each shaft, and means for securing the driving means in operative driving engagement with the shafts.

13. A core controlling device for bale forming machines, comprising a pair of threaded shafts, a yoke carried by said shafts and operable thereon, means for connecting the core pin to the yoke, means for causing said shafts to rotate in synchronism, separate driving means loosely mounted on each shaft, and clutches for securing said driving means in operative driving engagement with the shafts.

14. A core controlling device for bale forming machines, comprising a pair of threaded shafts, a yoke carried by said shafts and operable thereon, means connecting the core pin to the yoke, means for causing said shafts to rotate in unison, separate driving means loosely mounted on each shaft, clutches for securing said driving means in operative driving engagement with the shafts, and automatically operated means for disconnecting the clutches from said driving engagement.

15. In a bale forming machine, in combination, a head frame, bearings mounted therein, a core pin in engagement with said bearings, means for wrapping cotton around said pin, a core withdrawing and supporting device carried by the head frame and comprising a threaded shaft journaled at one end in said head frame, means for rotating said shaft, a yoke movable longitudinally thereof, means for connecting the yoke to the core pin, and means for reversing the direction of rotation of the shaft.

JOHN A. TAFT.

Copies of this patent may be obtained for five cents each, by addressing the "Commissioner of Patents, Washington, D. C."